Sept. 1, 1959 E. A. LUEBKE ET AL 2,902,423
NEUTRONIC REACTOR PRODUCING THERMOELECTRIC POWER
Filed Feb. 2, 1956 5 Sheets-Sheet 1

INVENTORS
Emmeth A. Luebke
Leonard B. Vandenberg
by Roland A. Anderson
Attorney

Sept. 1, 1959 E. A. LUEBKE ET AL 2,902,423
NEUTRONIC REACTOR PRODUCING THERMOELECTRIC POWER
Filed Feb. 2, 1956 5 Sheets-Sheet 2

INVENTORS
Emmeth A. Luebke
Leonard B. Vandenberg
by Roland A. Anderson
Attorney

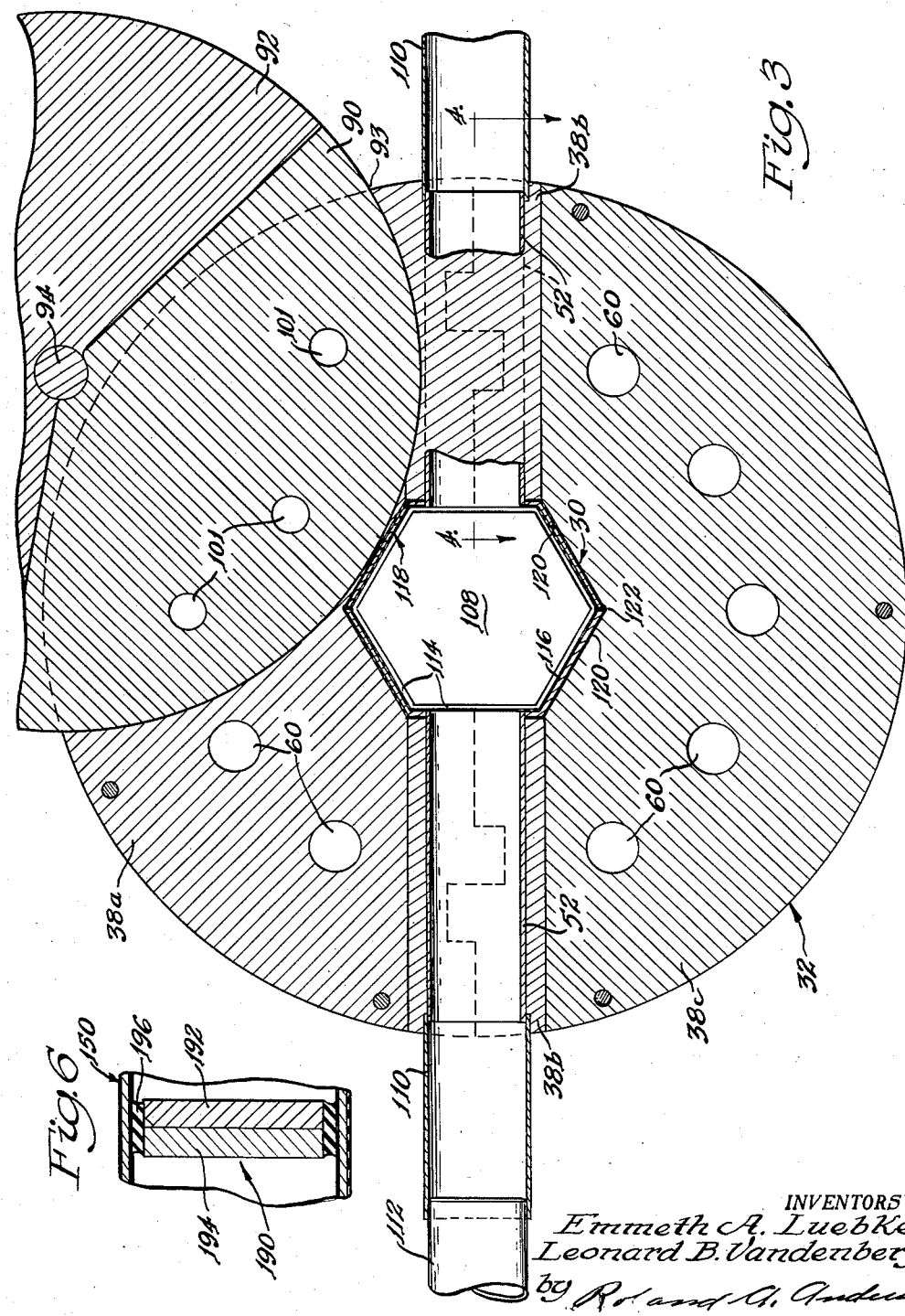

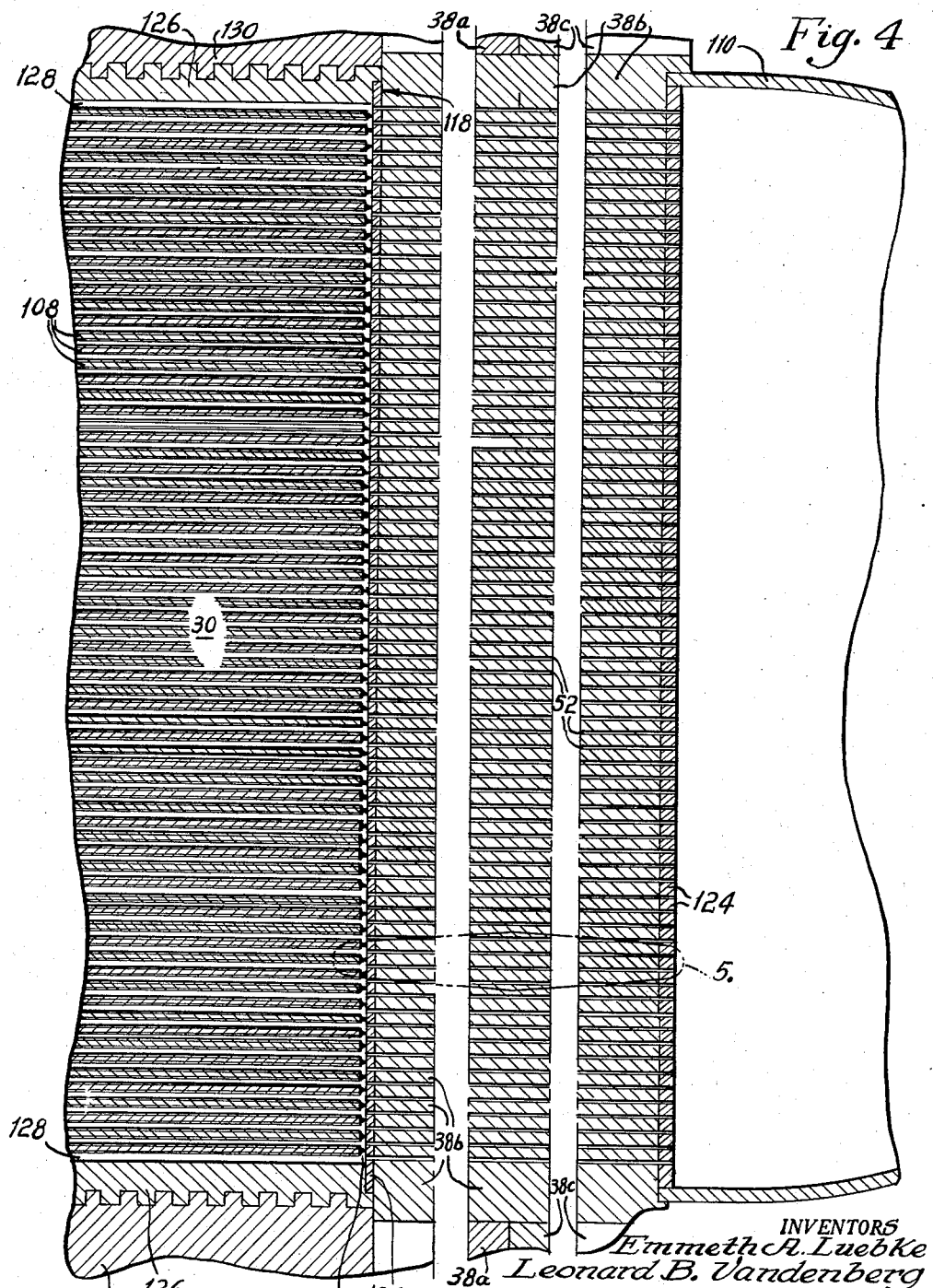

INVENTORS
Emmeth A. Luebke
Leonard B. Vandenberg
by Roland A. Anderson
Attorney

United States Patent Office 2,902,423
Patented Sept. 1, 1959

2,902,423

NEUTRONIC REACTOR PRODUCING THERMOELECTRIC POWER

Emmeth A. Luebke and Leonard B. Vandenburg, Schenectady, N.Y., assignors to the United States of America as represented by the United States Atomic Energy Commission Application February 2, 1956, Serial No. 563,162

10 Claims. (Cl. 204—193.2)

The present invention relates generally to neutronic reactors and in particular to neutronic reactors producing thermoelectric power due to heat and neutron irradiation.

It is well known that if the junction of two wires of unlike metals (such as Chromel and Constantan) are heated, and if the ends are connected in a circuit, an electromotive force results (Seebeck effect). It is also known that if the junction of some elements is subjected to an intense irradiation, an electromotive force, due to both heat and radiation particle bombardment, will be developed across the cold junction.

Nuclear reactors operated at high temperatures and high specific powers for power production usually have large temperature gradients in their fuel structures. These temperature gradients can be utilized in properly arranged fuel elements to develop thermoelectric power in addition to the power normally extracted by a reactor coolant and delivered into a heat exchanger in a steam turbine-generator system.

The main object of the invention is to provide a neutronic reactor having an arrangement of fuel elements in the core of a reactor to produce thermoelectric power by heat and neutron irradiation.

Another object of the invention is to provide a neutronic reactor having an arrangement of fuel elements in the core of the reactor to produce thermoelectric power which is used in a closed electric circuit including the elements to achieve internal cooling of the fuel elements.

A further object of the invention is to provide a neutronic reactor having a core comprising a series of fuel assemblies cooled by an electrically conductive fluid to generate thermoelectric power.

Another object of the invention is to provide a novel thermopile having incorporated therein material responsive to irradiation, said thermopile being cooled by an electrically conductive fluid.

The present objects and advantages of this invention will become apparent and will be better understood by reference to the following description in conjunction with the accompanying drawings, wherein:

Fig. 3 is a sectional view of a reactor, slightly enlarged, taken along the line 3—3 of Fig. 1;

Fig. 4 is a greatly enlarged sectional view taken along the line 4—4 of Fig. 3 showing the structure of the thermoelectric assemblies;

Fig. 6 is a cross sectional view of a second embodiment of the invention showing the structure of a single thermoelectric assembly;

In accordance with the teachings of the invention, there is provided a neutronic reactor having a plurality of fuel elements arranged in assemblies, each assembly comprising a fuel element sandwiched between a Constantan and a Chromel element to form a hot junction in a thermocouple, and the thermocouples being arranged in series to form a thermopile. The assemblies are supported in a spaced apart relationship to permit the circulation of an electrically conductive coolant to provide the cold junction for each thermocouple, as well as to provide a conductive path for the thermoelectric current flowing transversely to the flow of coolant through the assemblies. The thermoelectric power output developed by the thermopile may be used externally to the reactor to drive a load or used internally to maintain lower temperatures within the assemblies.

Figure 1:
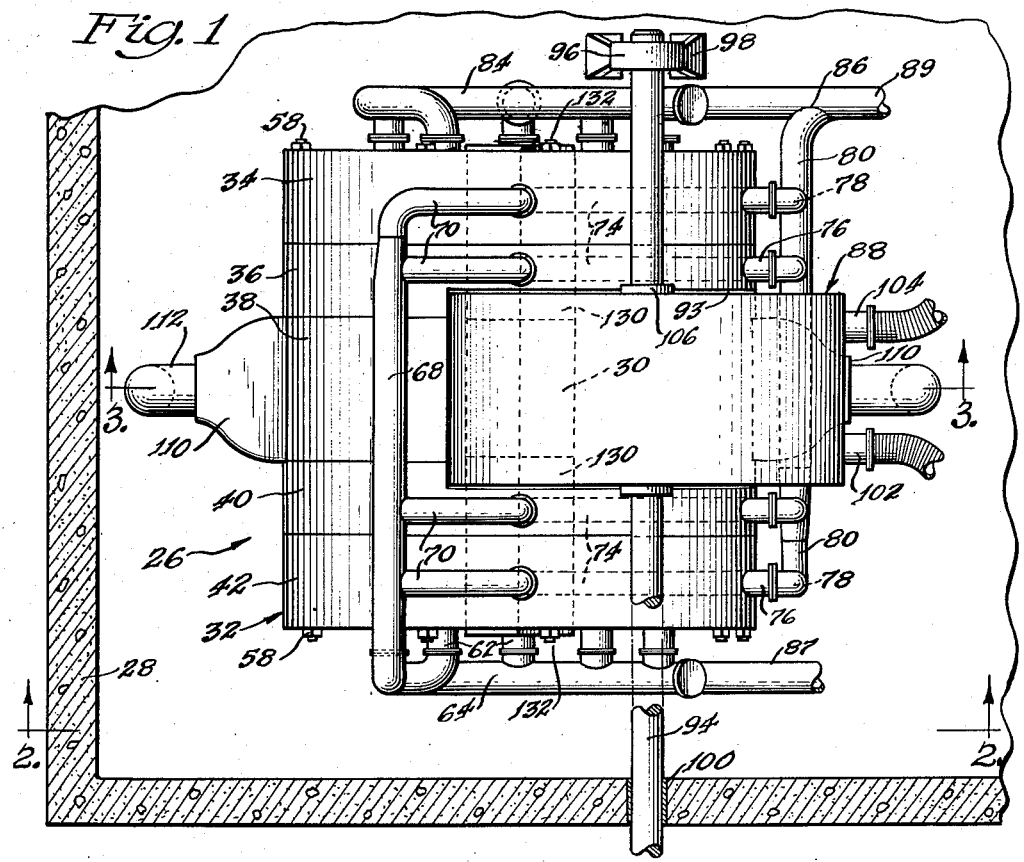
Fig. 1 is a top view of a neutronic reactor constructed in accordance with the teachings of this invention.
Figure 2:
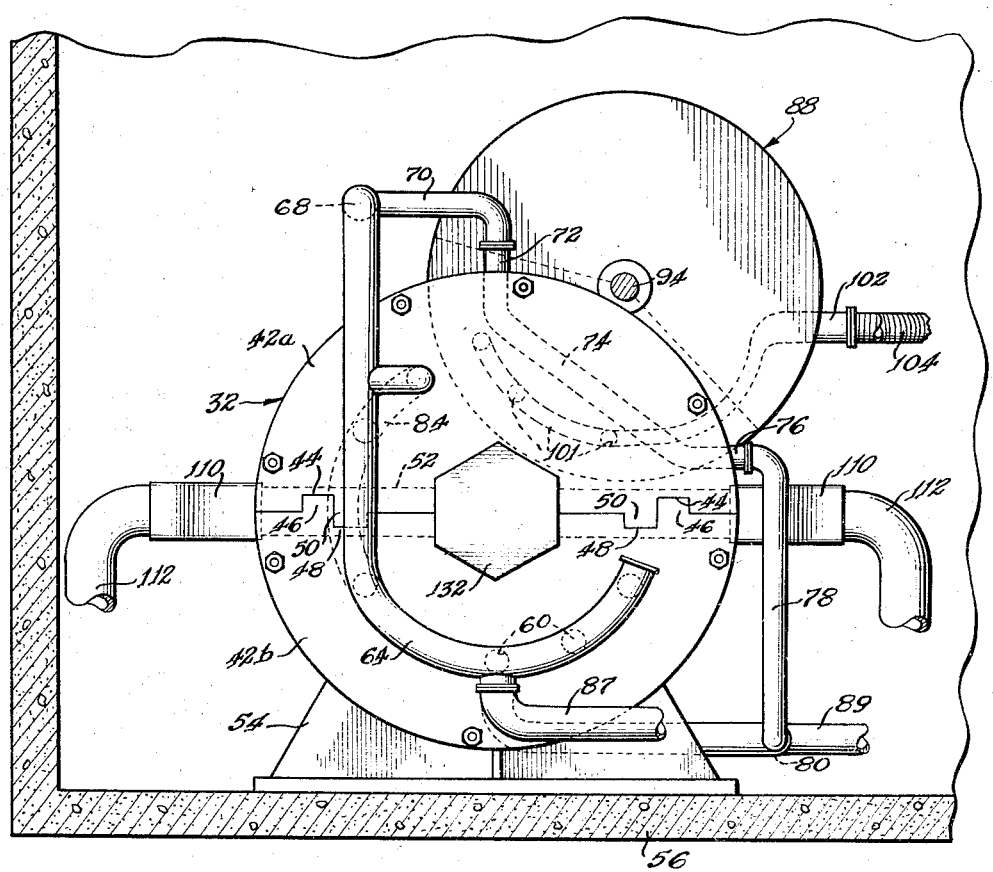
Fig. 2 is a side view of the neutronic reactor.

Referring to Figs. 1, 2 and 3, a neutronic reactor 26 is mounted within a concrete enclosure 28 which is used to prevent radiation from emanating therefrom and endangering personnel operating in the vicinity thereof. The neutronic reactor 26 comprises a core 30 enclosed by a blanket 32 made of natural uranium forming a series of blanket sections 34, 36, 38, 40 and 42. For example, the section 42 comprises two semicylindrical portions 42a and 42b as readily seen in Fig. 2. The portion 42a has slots 44 located near the periphery thereof which engage with protuberances 46 machined in the portion 42b. Similarly, the portion 42b has a pair of slots 48 which engage with a pair of protuberances 50 formed in the portion 42a. The engagement of the protuberances 46 and 50 with the slots 44 and 48, respectively, prevents the loss of neutrons from the active portion 30 of the reactor 26. The other end section 34 is similarly constructed. The remaining sections 36, 38 and 40 similarly possess slots and protuberances to prevent the escape of neutrons from the center of the reactor 2. The construction of the inner sections 36, 38 and 40 is somewhat modified as can be readily seen in Fig. 3 which discloses a section through the reactor section 38. In this view, the cross section of the section 38 reveals that it comprises more than two portions as previously described in reference to the end sections 34 and 42. The section 38 comprises portions 38a, 38b, and 38c. The portion 38b is embedded around a plurality of coolant conduits 52 communicating with the core 30, as will be explained hereinafter.

The entire structure of the reactor 26 is supported by a stand 54 mounted on a concrete floor 56. The various sections 34, 36, 38, 40 and 42 are tightly compressed together by rod and nut assemblies 58. Each section 34, 36, 38, 40 and 42 has a plurality of openings 60 (2 cm. diameter) for the admission of a coolant to remove the heat generated by fission in the fuel contained in the particular section. Leak proof continuity of the openings 60 between the various sections 34, 36, 38, 40 and 42 is obtained conventionally through the use of O rings. Each of the openings 60 terminates in a pipe extension 62 attached to the section 42, which extension is coupled by suitable means to a side manifold 64 which has C-shaped structure and is connected to an overhead manifold 68. The manifold 68 is connected through pipes 70 terminating at the top of the sections 34, 36, 40 and 42 to pipe extensions 72 attached to internal cooling channels 74 (shown by dotted lines) which extend outward through the pipe extensions 76 and pipes 78 to a bottom manifold 80. The openings 60 which extend through the entire length of the reactor 26 terminate in pipe extensions 82 which are connected to a side manifold 84. The manifolds 80 and 84 are connected together at a junction 86. A pipe 87 is connected to the manifold 64 and a pipe 89 is connected to the manifolds 84 and 80 to provide a flow circuit for a coolant, such as water.

The control of the reactor 26 is obtained by means of a control rotor 88 which is essentially a cylinder comprising two sections 90 and 92. The rotor 88 is rotatably mounted in a radial recess 93 in the sections 36, 38 and 40. The section 90 of the rotor 88 is constructed of uranium with the isotopic content found in nature and may be termed the "blanket" section of the rotor, and the section 92 is constructed of a material relatively transparent to neutrons, such as steel, in order to provide a mechanically balanced rotor. The control rotor 88 is supported on a shaft 94 having one extremity thereof terminating in a bearing 96 mounted in a bed 98. The other end of the shaft 94 extends through a sleeve 100 mounted in the enclosure 28. The control of the reactor 26 is achieved by rotating the control rotor 88 in such manner as to increase or to decrease the amount of flux leakage out of the core 30 of the reactor 26 by adjusting the position of the blanket section 90 within the stationary portion of the blanket 32. Rotating the control rotor 88 so that a maximum amount of the uranium contained in the section 90 is disposed in the indentation 93 in the blanket 32 will result in a minimum of neutron flux leakage out of the core 30. Rotation of the control rotor 88 to other intermediate positions will allow more neutron flux to escape from the core 30. Inasmuch as heat is also generated in the control rotor 88, a plurality of channels 101 are molded within the section 90. These channels terminate in pipe extensions 102 which are connected to a source of cooling water through a pair of flexible tubes 104 which enable the control rotor 88 to be rotated within the limits required for controlling the reaction occurring within the core 30 of the reactor 26. The control rotor 88 is mounted on the shaft 94 and secured thereto by lock rings 106.

The core 30 of the reactor 26 contains a plurality of assemblies, hereinafter referred to as thermoelectric assemblies 108 but which also operate as fuel elements, the structure of which will be described later in detail. The thermoelectric assemblies 108 are cooled by an electrically conductive coolant, such as sodium, flowing through the conduits 52 terminating in manifolds 110. The manifolds 110 are connected through pipes 112 to turbogenerator equipment as will be described hereinafter.

Figure 5:
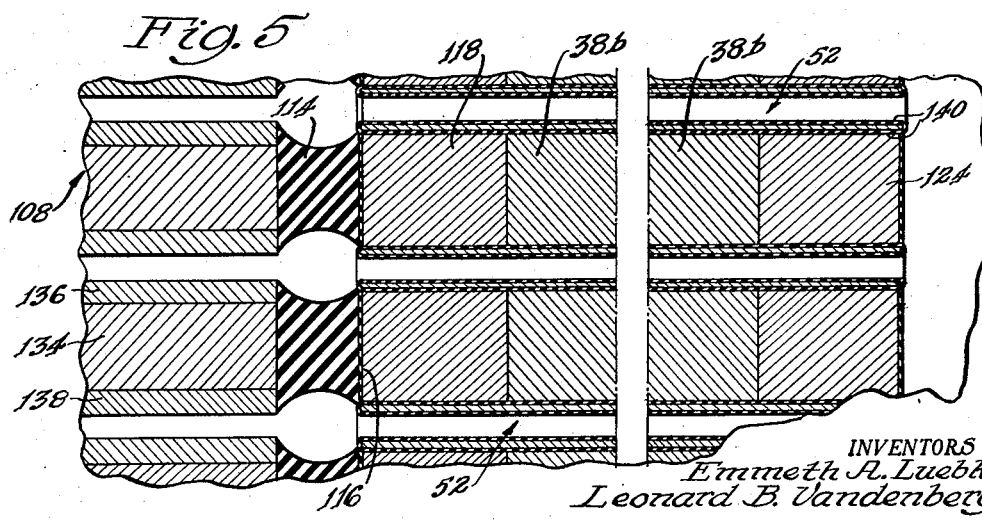
Fig. 5 is a greatly enlarged view of a portion of the thermoelectric assemblies shown in Fig. 4.

As shown in Figs. 3, 4 and 5, the core 30 of the reactor 26 comprises a plurality of thermoelectric assemblies 108 disposed on the longitudinal axis of the reactor, each having an electrically insulating bead 114 made of ceramic material, such as aluminum oxide or an appropriate enamel, which is fused to the thermoelectric assembly 108 as well as to an inner wall 116 of a housing 118 containing said thermoelectric assemblies. The housing 118, as well as the thermoelectric assemblies 108 which it encompasses, is hexagonal in shape as shown in Fig. 3. The housing 118 is made of two equal sections 120 which are held in an assembled state by means of ceramic welds 122. The housing 118 is constructed of steel which is coated on the inside and outside with a ceramic coating commonly known as enamel.

A better description of the disposition of the thermoelectric assemblies 108 and the associated coolant conduits 52 may be had from Fig. 4 and Fig. 5, the latter showing an enlarged section of the thermoelectric structure described in Fig. 4. The conduits 52 are constructed of flat steel tubes which are internally, as well as externally, enamelled to electrically insulate a conductive fluid, such as sodium, flowing in one tube from the fluids flowing in other conduits 52. The conduits 52 terminate at one end thereof in an end wall 124 of the manifold 110. The other ends of the conduits 52 terminate in the wall 120 of the housing 118. The conduits 52 are embedded in a portion 38b which is made of natural uranium. The thermoelectric assemblies 108 are aligned on a common axis in a spaced apart relationship by means of the beads 114 which are fused to the enamel surface of the inner wall 116 of the housing 118. As a result, the thermoelectric assemblies 108 are electrically insulated from each other in the housing 118. The housing 118 terminates at each end thereof in a copper end plate 126 which forms a channel 128 to allow the coolant to flow therethrough. Each end plate 126 has a series of serrations in its outer surface which engage a similarly serrated surface of a copper bus bar 130 which extends slightly beyond the blanket sections 34 and 42 as is visible by bus bar extensions 132 shown in Fig. 1. The extensions 132 may be connected by a suitable electrical circuit for driving an electrical load by means of the thermoelectric potential developed across the two extensions 132, as will be described hereinafter. The mated serrated surfaces existing between the end plates 126 and bus bars 130 provide good electrical contact.

A portion of the structure indicated by reference number 5 in Fig. 4 has been greatly enlarged in Fig. 5 to indicate the insulating layers contained in said structure. Each thermoelectric assembly 108 comprises a central hexagonal element 134 in the form of a flat plate made of uranium containing 90% $U^{235}$ and approximately 10% $U^{238}$ by weight. The central element 134 is flanked by plate-shaped outer elements 136 and 138. The upper outer element 136 of each assembly, as shown in Figure 5 is made of Constantan which is commercially available and comprises 45% nickel and 55% copper by weight. The lower outer element 138 is made of Chromel which is also commercially available and comprises 90% nickel and 10% chromium by weight. The thermoelectric assembly 108 is fabricated by combining the three elements 134, 136 and 138 together and then subjecting it to action in a rolling mill until a good intimate contact is formed therebetween. This sandwiched layer comprising the aforesaid three elements is then trimmed to size and mounted within the housing 118 on a bead of ceramic material which is extruded by suitable means and disposed on the periphery of the thermoelectric assembly 108. The uranium central element 134, being an electric conductor, serves as the hot junction of the thermocouple between the two dissimilar metal elements 136 and 138 respectively. The electrically conducting sodium coolant flowing between adjacent subassemblies 108 serves as a cold junction between the Constantan element of one assembly 136 and the Chromel element 138 of the adjacent assembly. Thus the parallel arrangement of the assemblies 108 within the core 30 and the sodium flowing therebetween forms a plurality of series connected thermocouples (commonly known as a thermopile) which will generate an electric current across the core, normal to the direction of coolant flow during operation of the reactor.

As indicated before, the conduits 52 are embedded in the material comprising the reactor portions 38b and terminate in the end wall 124 of the manifold 110 and in the housing 118. The conduits 52 have an enamel lining 140 on the interior and exterior thereof, so that the conduits are electrically insulated from the embedding material 38b, the end wall 124 of the manifold 110 and the housing 118. As a result, it is clearly seen that a flow of an electrically conducted coolant through each of the conduits 52 will not create a short circuit in the vicinity of the core 30 between the outer elements 136 and 138 of each thermoelectric assembly 108.

After the thermoelectric assemblies 108 are assembled within the housing 118 with the extruded beads 114 around their perimeters, and after the conduits 52 are engaged with the housing 118 and firmly embedded in the material of portions 38b, the entire structure is placed into an annealing furnace to fuse the various ceramic materials found in the structure. As a result, the heat will cause the ceramic material to flow and cause the fused bead 114 to assume the filleted shape indicated in Fig. 5. Additionally, the various surfaces between the conduits 52 and the terminating structure 118 and 124 are also fused to each other to provide leak-proof and electrically insulated surfaces to the flow of coolant therethrough.

The core coolant, which in the present application is sodium, is admitted through one of the pipes 112 and passed to an adjacent manifold 110 which distributes the flow of the sodium into each of the conduits 52 which channel individual amounts of the coolant between each adjoining pair of thermoelectric assemblies 108. The sodium, after removing the heat generated during the fission process, flows outward through the other set of the conduits 52 into the adjoining manifold 110 and outward through the pipe 112. A further description of the flow of the sodium through the reactor will be described later in reference to overall operation.

Figure 9:
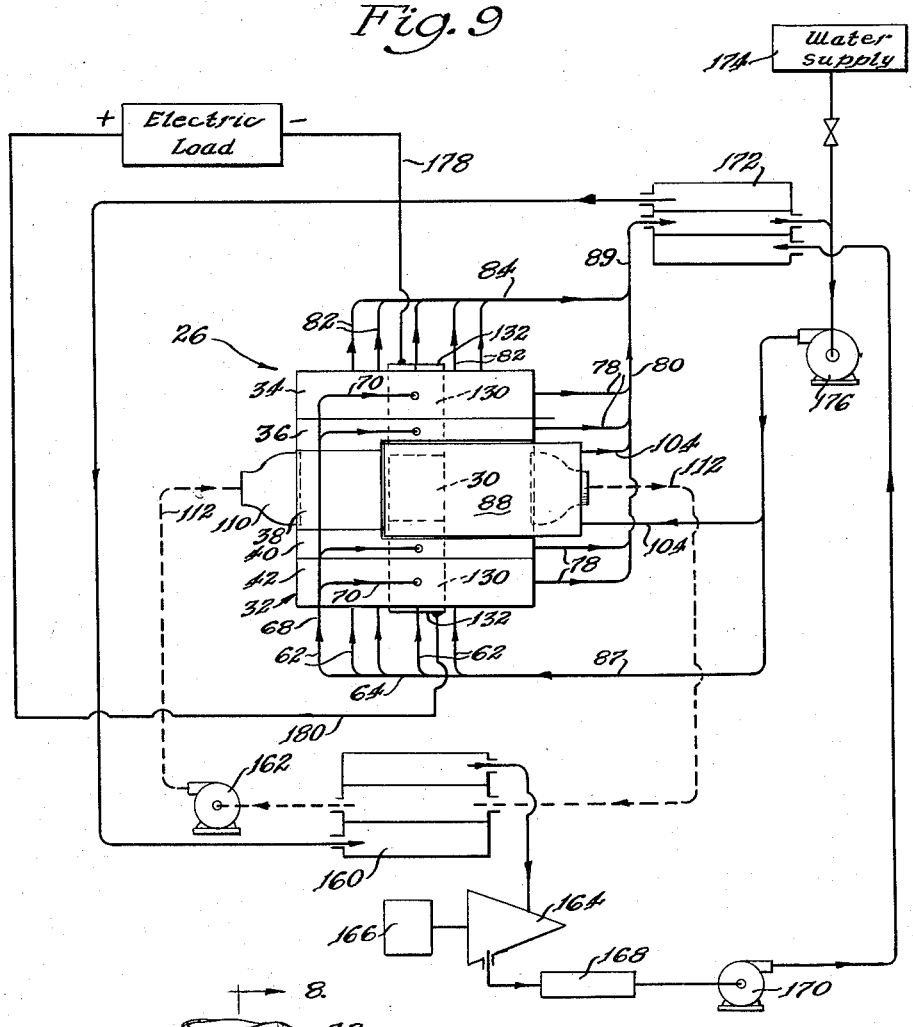
Fig. 9 is a schematic view of the neutronic reactor showing its connections with a turbogenerator system.

The utilization of the power output, both thermoelectric and heat, is fully illustrated in the schematic diagram shown in Fig. 9. The sodium flowing through the core 30 of the reactor 26 is removed through pipes 112 and made to circulate in a heat exchanger, or steam generator 160, which transfers the heat from the sodium to a surrounding flow of water in the other chambers of the heat exchanger 160. After giving up its useful heat, the sodium is forced by a pump 162 through the pipe 112, the manifold 110, and back into the core 30 of the reactor 26. The steam which is generated within the exchanger 160 is passed into a turbine 164 which is coupled to an electric generator 166. The spent steam is removed from the turbine 164 and passed into a condenser 168 where it is converted into feedwater and subsequently withdrawn by a pump 170 and forced into a preheater 172. The feedwater is initially preheated in the preheater 172 and then is passed again into the heat exchanger 160 to reestablish the steam cycle.

The heat which is generated within the blanket 32 is utilized for preheating the feedwater as described previously. A water supply 174 is connected to the preheater 172 and to a pump 176. The pump 176 forces water into the pipe 104 which is connected to the control rotor 88 and also forces water into the side manifold 64 which is connected by pipe extensions 62 to the internal channels 60 contained in the blanket sections 34, 36, 38, 40 and 42; also, water is forced through the overhead manifold 68 through pipe extensions 70 into the top portions of the sections 34, 36, 40 and 42. The water which is introduced into the reactor 26 by means of the pipe extension 62 is made to flow outward through pipe extensions 82 connecting into the side manifold 84. The water forced into the top portions of the sections 34, 36, 40 and 42 is made to pass out through the pipe extensions 78 into the manifold 80. The manifold 80 combines with the manifold 84 to pass heated water into the preheater 172 to warm the feedwater pumped into said preheater by the pump 170.

The thermoelectric power which is developed in the core 30 of the reactor 26 is brought outward through bus bars 130 and through their extensions 132 to lines 178 and 180. The lines 178 and 180 are connected across any electric load. The bus bars 130 have a large cross section area to provide a low resistance electrical path for the output power. The electrical and thermal conductivity of sodium is fairly good, therefore the sodium provides an intimate contact between adjacent thermoelectric assemblies 108 and provides a cold junction in the thermocouple scheme.

In the above construction of a thermoelectric assembly, Constantan and Chromel were used to form a thermocouple. It is well known that other materials may be used to form the couple. Although it is conventional to use metals in the thermocouples, semiconductor materials, such as germanium and silicon, which exhibit thermoelectric power output even greater than metals, may be used in the present thermoelectric assemblies.

The dimensions of the reactor structure including the thermoelectric assemblies 108 are given in the following tables:

*Reactor structure*

Thermocouple assembly 108:
Number of assemblies _____ 68.
Length of the series of assemblies ____ 21.6 cm.
Spacing between adjacent assemblies _____ .042 cm.
Central element 134—
 Material _____ Uranium containing 90% $U^{235}$ and approximately 10% $U^{238}$ by weight.
 Distance measured across hexagonal flats _____ 17.7 cm.
 Thickness _____ 0.177 cm.
Outer element 136—
 Material _____ Constantan.
 Distance measured across hexagonal flats _____ 17.7 cm.
 Thickness _____ 0.05 cm.
Outer element 138—
 Material _____ Chromel.
 Distance measured across hexagonal flats _____ 17.7 cm.
 Thickness _____ 0.05 cm.
Blanket 32:
 Material _____ Natural uranium.
 Outside diameter _____ 80.0 cm.
 Length _____ 86.0 cm.
Fissionable fuel:
 68 thermoelectric assemblies 108 ___ 55.55 kg. uranium containing 90% $U^{235}$.
 Blanket 32 including control rotor 88 _____ 5,190 kg. natural uranium.
Radiation enclosure:
 Material _____ Concrete.
 Wall thickness _____ 90 cm.

*Power data*

Inlet temperature of sodium _____ 178° C.
Outlet temperature of sodium _____ 250° C.
Flow rate of Na through each conduit 52 _____ 200 grams/sec.
Total heat output _____ 1,296 kw.
Temperature gradient across each thermoelectric assembly 108 _____ 7.3° C.
Thermoelectric potential developed across each thermoelectric assembly 108 _____ $5.11 \times 10^{-4}$ v.
Resistance across all thermoelectric assemblies 108 _____ $4.38 \times 10^{-3}$ ohms.
Total thermoelectric power output ____ 200 watts.

The thermoelectric assembly 118, as shown in Figs. 3, 4 and 5, comprises the central element 134 of fissionable fuel material flanked by two non-fuel elements 136 and 138 to effect an active thermocouple. The heat that is generated in each thermoelectric assembly 108 is at a maximum at the center of the fuel element 134. This maximum heat cannot be fully utilized to achieve an optimum thermoelectric output across the two active elements 136 and 138 unless the fuel element 134 were infinitely thin.

A second modification of a thermoelectric assembly may be made utilizing only two elements comprising two dissimilar fissionable fuel materials as is shown in Fig. 6, wherein a thermoelectric assembly 190 comprises elements 192 and 194 supported by a ceramic bead 196 engaging the inner wall of a housing 150. It is to be understood that the thermoelectric assembly 190 is a substitute for the thermoelectric assemblies 108 used in the reactor of Figs. 1 through 5, and that all other materials and dimensions of the reactor remain unchanged when substituting the assemblies 190. Only a portion of the housing 150 is disclosed to show the construction of only one thermoelectric assembly 190. The element 192 possesses a hexagonal shape that is constructed of pure $U^{235}$ and the element 194 possesses a similar hexagonal shape and is constructed of an alloy consisting of $U^{235}$ having an addition of 0.07% iron and 0.02% oxygen. It is to be understood that by "pure $U^{235}$" it is intended that $U^{235}$ with not more than .01% impurities be employed. This small amount of foreign material in uranium is sufficient to give a thermoelectric difference of 1.92 millivolts at 800° C. Further, the thermoelectric potential across the two elements 192 and 194 can be enhanced by increasing the degree of impurity in one of the elements. The method of construction of the thermoelectric assembly 190 is similar to the method previously described in reference to the thermoelectric assembly 108.

As has been described previously in reference to the neutronic reactor utilizing the thermoelectric assembly 108, the thermoelectric power output generated by the heat and the radiation present in the core 30 of the reactor 26 has been used externally for driving an electric load. Instead of utilizing the thermoelectric power output to perform useful function outside of the reactor proper, the thermoelectric power developed within the core 30 of the reactor 26 may be utilized in cooling the thermoelectric assemblies within the core 30.

Figure 8:
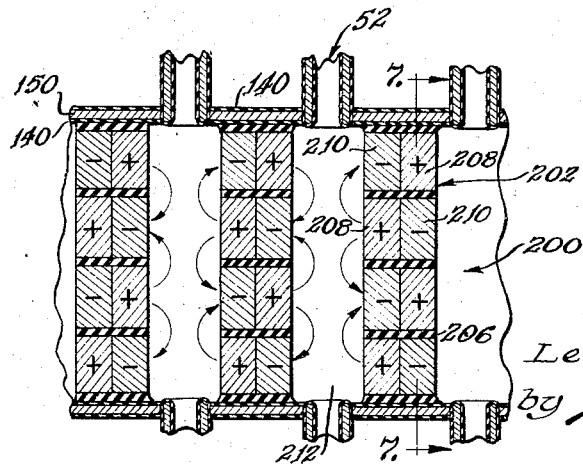
Fig. 8 is a cross sectional view of a series of thermoelectric assemblies taken along the line 8—8 of Fig. 7.
Figure 7:
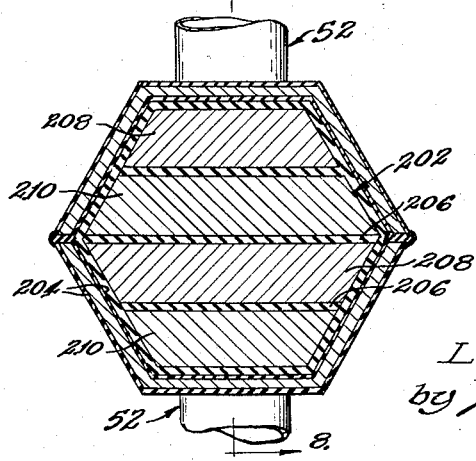
Fig. 7 is a cross sectional view of a third embodiment of the invention showing the structure of thermoelectric assemblies.

An additional modification of the invention, namely a thermoelectric assembly arrangement whereby the thermoelectric power is used only to cool the thermoelectric assemblies, is described in Figs. 7 and 8. A portion of a housing 150 contains several thermoelectric assemblies 200, each thermoelectric assembly 200 comprising several thermocouples 202. The thermocouples 202 of each thermoelectric assembly 200 are contained in a matrix 204 which has walls 206 isolating each thermocouple 202 from other adjoining thermocouples. Each thermocouple 202 comprises an element 208 made of pure $U^{235}$, and another element 210 also constructed of $U^{235}$ but with added impurities, namely 0.07% iron and 0.02% oxygen. $U^{235}$ can be obtained by electromagnetic separation of uranium isotopes, as is well known. The two elements 208 and 210 are in intimate contact with each other to provide an excellent thermocouple. The thermoelectric assembly 200 is prepared by first pouring the pure $U^{235}$ into the matrix 204 to form the element 208 and then waiting and allowing the mass to cool off before pouring the $U^{235}$ with added materials on top of the first poured element 208. The order of pouring is such because the pure $U^{235}$ requires a higher pouring temperature. The construction of the housing 150 is the same as the construction of the other housings previously described herein. The housing 150 is also internally and externally coated with an enamel layer 140.

A series of conduits 52 supply a coolant into the spaces 212 formed between adjacent thermocouple assemblies 200. Each conduit 52 is also coated with an enamel layer 140 to provide isolation against electrical conductivity in the housing 150 and in the conduits 52. The electrically conductive coolant which flows through the conduits 52 into the space formed between each pair of thermoelectric assemblies 200 provides a cold junction for each thermocouple 202. The thermoelectric potential developed across each thermocouple 202 is utilized to force a current to flow from one element, such as 208 of each thermocouple 202 to a dissimilar element, such as 210 in an adjacent thermocouple 202. This flow of current in the housing 150 is amply illustrated by arrows in Fig. 8. It is well known that the flow of current through a thermocouple will remove the heat present at the hot junction of the two dissimilar metals. As a result of this, the thermocouples 202 may be constructed of thicker fuel elements 208 and 210 than would be permissible without the flow of electric current.

While specific arrangements and embodiments have been disclosed, it will be understood that the invention is not limited thereto, and that various changes and modifications may be made without departing from the spirit and scope of the invention.

What is claimed is:

1. In a fast-neutron-fissionable nuclear reactor comprising a core having fissionable fuel enclosed by a blanket, said core having sufficient fissionable fuel to sustain a chain reaction, said blanket having a movable portion adapted to control the amount of leakage of neutrons from said core, the improvement wherein the core comprises a series of thermoelectric assemblies arranged in a housing, each assembly including fissionable fuel as an active element thereof to form a hot junction of a thermocouple, said assemblies being disposed parallel to each other to form spaces therebetween, means for introducing an electrically conductive coolant between the assemblies to form cold junctions of the thermocouples and means cooperating with said coolant to connect said thermoelectric assemblies in series whereby an electromotive force is developed across the entire series of said thermoelectric assemblies due to fission heat generated in the fuel.

2. The matter as claimed in claim 1, each thermoelectric assembly comprising a first element made of fissionable fuel material, a second element made of material having a particular thermoelectric potential, and a third element made of material having a different thermoelectric potential, said first element being disposed between the second and the third elements in intimate contact therewith to form a hot junction of a thermocouple.

3. The matter as claimed in claim 1, each thermoelectric assembly comprising a first element made of pure fissionable fuel material and a second element made of fissionable fuel containing traces of other elements so the said first and second elements have different thermoelectric potentials, both of said elements being in intimate contact with each other to form a hot junction of the thermocouple.

4. The matter as claimed in claim 2, the first element containing 90% $U^{235}$, the second element consisting of Constantan, the third element consisting of Chromel, and the coolant being sodium, the uranium being flanked by the Constantan and the Chromel elements and in intimate contact therewith to provide heat for the thermocouple when subjected to neutron radiation.

5. The matter as claimed in claim 3, the first element being essentially pure $U^{235}$, the second element being made of pure $U^{235}$ having 0.07% iron and 0.02% oxygen, inclusions, and the coolant being sodium.

6. A thermoelectric assembly for use in a neutronic reactor having an electrically conductive coolant comprising a first element consisting of 90% $U^{235}$, a second element made of Constantan, and a third element made of Chromel, said first element being flanked by the other two elements in intimate contact therewith to form a hot junction of a thermocouple and to serve as a source of heat when subjected to neutron irradiation.

7. A thermoelectric assembly for use in a neutronic reactor having an electrically conductive coolant comprising a first element consisting of 99.99% pure $U^{235}$ and a second element consisting of 99.99% pure $U^{235}$, 0.07% iron, and 0.02% oxygen, said elements being in intimate contact with each other to form a hot junction of a thermocouple 8. In a fast-neutron-fissionable nuclear reactor comprising a core having fissionable fuel enclosed by a blanket, said core having sufficient fissionable material to sustain a chain reaction, said blanket having a movable portion thereof adapted to control the amount of leakage of neutrons from the core, the improvement wherein the core comprises a series of thermoelectric assemblies disposed in a housing, said assemblies being disposed parallel to each other to form spaces therebetween, each assembly comprising a plurality of thermocouples adjacently positioned and isolated from each other, each thermocouple being formed of at least two different fissionable fuel materials, means for introducing an electrically conductive coolant between the assemblies to form a cold junction of a thermocouple, whereby during fission, an electric current produced by the thermoelectric potential of each thermocouple flows through the adjacent thermocouples to cool the hot junction existing between the fissionable fuels.

9. The matter as claimed in claim 8, the thermocouple comprises a first element made of pure fissionable fuel material and a second element made of fissionable fuel containing traces of other elements so the said first and second elements have different thermoelectric potentials, both of said elements being in intimate contact with each other to form hot junction of the thermocouple.

10. The matter as claimed in claim 9, the first element being made of 99.99% pure $U^{235}$, the second element being made of 99.99% pure $U^{235}$, 0.07% iron, and 0.02% oxygen, and the coolant being sodium.

References Cited in the file of this patent

UNITED STATES PATENTS

| | | |
|---|---|---|
| 2,579,994 | Zinn | Dec. 25, 1951 |
| 2,652,503 | Pack | Sept. 15, 1953 |
| 2,671,817 | Groddeck | Mar. 9, 1954 |
| 2,677,772 | Moon | May 4, 1954 |
| 2,708,656 | Fermi et al. | May 17, 1955 |
| 2,851,766 | Gray | Sept. 16, 1958 |
| 2,854,738 | Gray | Oct. 7, 1958 |

FOREIGN PATENTS

| | | |
|---|---|---|
| 618,508 | Great Britain | Feb. 23, 1949 |

OTHER REFERENCES

U.S. Atomic Energy Commission Document ORNL–360, August 10, 1949, pages 5–7.